United States Patent [19]
Fukuoka

[11] Patent Number: 5,295,077
[45] Date of Patent: Mar. 15, 1994

[54] DIGITAL ELECTRONIC STILL CAMERA

[75] Inventor: Hiroki Fukuoka, Kawasaki, Japan

[73] Assignee: Ricoh Company, Ltd., Tokyo, Japan

[21] Appl. No.: 824,225

[22] Filed: Jan. 23, 1992

[30] Foreign Application Priority Data

Jan. 23, 1991 [JP] Japan ................................. 3-6477

[51] Int. Cl.⁵ .............................................. H04N 1/04
[52] U.S. Cl. ..................................... 358/479; 358/432;
358/433; 358/427; 358/426; 358/471; 358/462;
358/444; 358/909.1; 395/900; 364/725;
348/405; 348/231
[58] Field of Search ............ 358/467, 427, 426, 261.2,
358/261.1, 432, 479, 448, 296, 433, 133, 136,
135, 909, 462, 444; 382/56; 395/900; 364/725,
724.16

[56] References Cited

U.S. PATENT DOCUMENTS

| | | | |
|---|---|---|---|
| 4,568,983 | 2/1986 | Bobick | 358/261.3 |
| 4,684,997 | 8/1987 | Romeo et al. | 358/261.3 |
| 4,729,035 | 3/1988 | Tanioka et al. | 358/426 |
| 4,930,007 | 5/1990 | Sugiura et al. | 358/467 |
| 4,982,282 | 1/1991 | Saito et al. | 358/261.3 |
| 5,016,107 | 5/1991 | Sasson et al. | 358/261.3 |
| 5,079,638 | 1/1992 | Kishi et al. | 358/448 |
| 5,107,345 | 4/1992 | Lee | 358/261.1 |
| 5,111,232 | 5/1992 | Tsunefuji | 395/900 |
| 5,138,673 | 8/1992 | Yoshida et al. | 358/432 |
| 5,142,380 | 8/1992 | Sakagami et al. | 358/432 |
| 5,162,923 | 11/1992 | Yoshida et al. | 358/432 |
| 5,172,237 | 12/1992 | Blonstein et al. | 358/261.3 |

FOREIGN PATENT DOCUMENTS

| | | |
|---|---|---|
| 2-105686 | 4/1990 | Japan . |
| 2-222281 | 9/1990 | Japan . |
| 2-257780 | 10/1990 | Japan . |
| 3-278683 | 12/1991 | Japan . |
| 4-20190 | 1/1992 | Japan . |

OTHER PUBLICATIONS

Interface, pp. 160-182, Dec. 1, 1991, Toshiaki Endou, "International Standard of Coding Method of Color Still Images".

Primary Examiner—Edward L. Coles, Sr.
Assistant Examiner—Fan Lee
Attorney, Agent, or Firm—Oblon, Spivak, McClelland, Maier & Neustadt

[57] ABSTRACT

A digital electronic still camera has an image pickup device to pick up an image to be photographed. The picked-up image data is compressed by a data compressing unit using the two-dimensional discrete cosine transformation (DCT), the optimum quantization table, and the Huffman coding. The optimum quantization table is selected by comparing a characteristic parameter of the image data with preliminarily obtained values for respective image kinds. The two-dimensional DCT provides transformation coefficients of image, which are linearly quantized with reference to the optimum quantization table. The quantized data is coded by the Huffman coding method to have a minimum length. The coded data is sent to a recording device, which records the coded data in a recording medium such as a memory card. Fuzzy control theory may be applied to determine whether the image attributes to a document, a portrait, or a landscape. The image attribute may also manually be set, for example, on an input device.

9 Claims, 9 Drawing Sheets

|   | 0 | 1 | 2 | 3 | 4 | 5 | 6 | 7 → u |
|---|---|---|---|---|---|---|---|---|
| 0 | 260 | 49 | -16 | 5 | 2 | 4 | 0 | 1 |
| 1 | -79 | 36 | -2 | -7 | 1 | -3 | -1 | -2 |
| 2 | 0 | -8 | 3 | -2 | -2 | 1 | 5 | 1 |
| 3 | -8 | -4 | 5 | -4 | 1 | 7 | 6 | -2 |
| 4 | -2 | -6 | -1 | 0 | -4 | -1 | 0 | -1 |
| 5 | -3 | -2 | -1 | -1 | 1 | 2 | -5 | -1 |
| 6 | -4 | -1 | 1 | 0 | 0 | -2 | 2 | 0 |
| 7 | 1 | 1 | 1 | 1 | -1 | 1 | 0 | 0 |

| 16 | 11 | 10 | 16 | 24 | 40 | 51 | 61 |
|----|----|----|----|----|----|----|----|
| 12 | 12 | 14 | 19 | 26 | 58 | 60 | 55 |
| 14 | 13 | 16 | 24 | 40 | 57 | 69 | 56 |
| 14 | 17 | 22 | 29 | 51 | 87 | 81 | 62 |
| 18 | 22 | 37 | 56 | 68 | 109 | 103 | 77 |
| 24 | 36 | 55 | 64 | 81 | 104 | 133 | 92 |
| 49 | 64 | 78 | 87 | 103 | 121 | 120 | 101 |
| 72 | 52 | 95 | 98 | 112 | 100 | 103 | 99 |

Fig.6B

| 8 | 6 | 8 | 10 | 20 | 35 | 50 | 65 |
|---|---|---|----|----|----|----|----|
| 6 | 7 | 8 | 18 | 23 | 60 | 61 | 56 |
| 8 | 7 | 15 | 22 | 41 | 56 | 69 | 63 |
| 8 | 13 | 21 | 28 | 53 | 83 | 81 | 70 |
| 15 | 20 | 39 | 57 | 69 | 100 | 105 | 90 |
| 22 | 35 | 59 | 62 | 80 | 103 | 130 | 95 |
| 48 | 63 | 78 | 83 | 102 | 120 | 121 | 103 |
| 70 | 53 | 99 | 101 | 112 | 110 | 104 | 101 |

Fig.6C

| 20 | 13 | 10 | 11 | 12 | 28 | 45 | 63 |
|----|----|----|----|----|----|----|----|
| 13 | 12 | 10 | 9 | 18 | 50 | 61 | 61 |
| 14 | 9 | 8 | 17 | 37 | 60 | 75 | 67 |
| 10 | 9 | 16 | 27 | 50 | 95 | 97 | 80 |
| 9 | 16 | 35 | 51 | 81 | 130 | 133 | 101 |
| 17 | 36 | 54 | 76 | 97 | 135 | 186 | 138 |
| 48 | 63 | 93 | 104 | 133 | 169 | 180 | 151 |
| 74 | 62 | 114 | 127 | 156 | 150 | 154 | 149 |

DIGITAL ELECTRONIC STILL CAMERA

BACKGROUND OF THE INVENTION

1. Field of the Invention

The present invention relates to a digital electronic still camera in which image signal data is compressed to be recorded in a recording medium such as a memory card.

2. Description of the Related Art

In an electronic still camera a memory card is detachably connected to a camera body having an image pickup optical system, a solid state pickup device, or the like, and image information of a still image picked up by such an image pickup device is stored in the memory card in the form of digital signals. The memory card storing the image information is taken out of the camera and set in a reproducing device to reproduce the still image read out thereof on a television screen. The image information stored in the memory card also is transmitted to and stored in a large capacity memory such as a hard disk so that it may be an electronic album. Further, the image information is transmitted through a data communication line by connecting the memory card to a communication system so that image data communication may be achieved.

Memory cards currently in actual use are those with about 16 Mbit semiconductor memory of SRAM. It has been desired to record as many still images or still pictures and sounds in the memory card as possible, which has led to development of compression of the recorded information. Adaptive discrete cosine transformation (ADCT) is a standardized basic method for the image data compression. Discrete cosine transformation is described in N. Ahmed, T. Natarajan, and K. R. Rao: "Discrete Cosine Transform", IEEE Transactions on Computers, pages 90-93 (January, 1974).

In case that the electronic still camera is used as a scanner scanning a black board like an electronic board to store information thereon, letters or characters are dominant in the photographed information. Conventionally, such an image dominated by letters has been compressed by the same method as that which is used for image of landscape or portrait which is hereinafter called an image of nature. The compression method applied to the image of nature is inefficient to compress the letter image due to its high redundancy.

This unsatisfactory compression of letter images in turn results in disadvantageous use of memory capacity of the memory card, since limited is the total amount of information to be recorded in the recording medium or memory card of electronic still camera.

In the conventional electronic still camera, a quantization table is used upon quantizing data as means to control a quality of an image. But an optimum quantization table has never been used separately for each kind of images, i.e., letter image, nature image, etc.

SUMMARY OF THE INVENTION

It is therefore an object of the present invention to provide a digital electronic still camera in which the quality of an image is properly adjusted in correspondence with an image difference, e.g., document image, portrait, landscape, and so on.

The object of the present invention can be achieved by a digital electronic still camera comprising an image pickup unit for picking up an image of a field to be photographed, a data compressing unit for compressing the image data with reference to a quantization table, a quantization table setting unit for providing said data compressing unit with the optimum quantization table for the image, and an image data recording unit for recording in a recording medium the image data compressed by the data compressing unit.

Further, the quantization table setting unit may employ fuzzy theory to judge an attribute of an image. It may also be employed to allow one to manually set the image attribute in the camera.

Fuzzy inference theory is described in E. H. Mamdani and S. Assilian: "An Experiment in linguistic Synthesis with a Fuzzy Logic Controller", International Journal of Man-Machine Studies, 7, 1, pages 1-13 (1974).

In the digital electronic still camera according to the present invention, the quantization table setting unit judges whether the image signal data is attributed to a document, a portrait, or a landscape, and selects an optimum quantization table for the judged image, and then the data compressing unit compresses the data based on the selected quantization table, whereby the quality of the image can be properly adjusted in correspondence with the image.

There are many uncertain factors to determine an attribute of an image, so that the fuzzy theory may be effectively applied to the determination of image attribute using a membership function, which may define a degree of fuzziness of the image attribute.

If the kind of images to be photographed is kept unchanged, the determination operation of image attribute may be omitted by holding the image kind by a manual operation, which allows high speed processing and reduction of judgement error.

Further objects and advantages of the present invention will be apparent from the following description of the preferred embodiment of the invention as illustrated in the accompanying drawings.

DESCRIPTION OF THE PREFERRED EMBODIMENT

Figure 1:
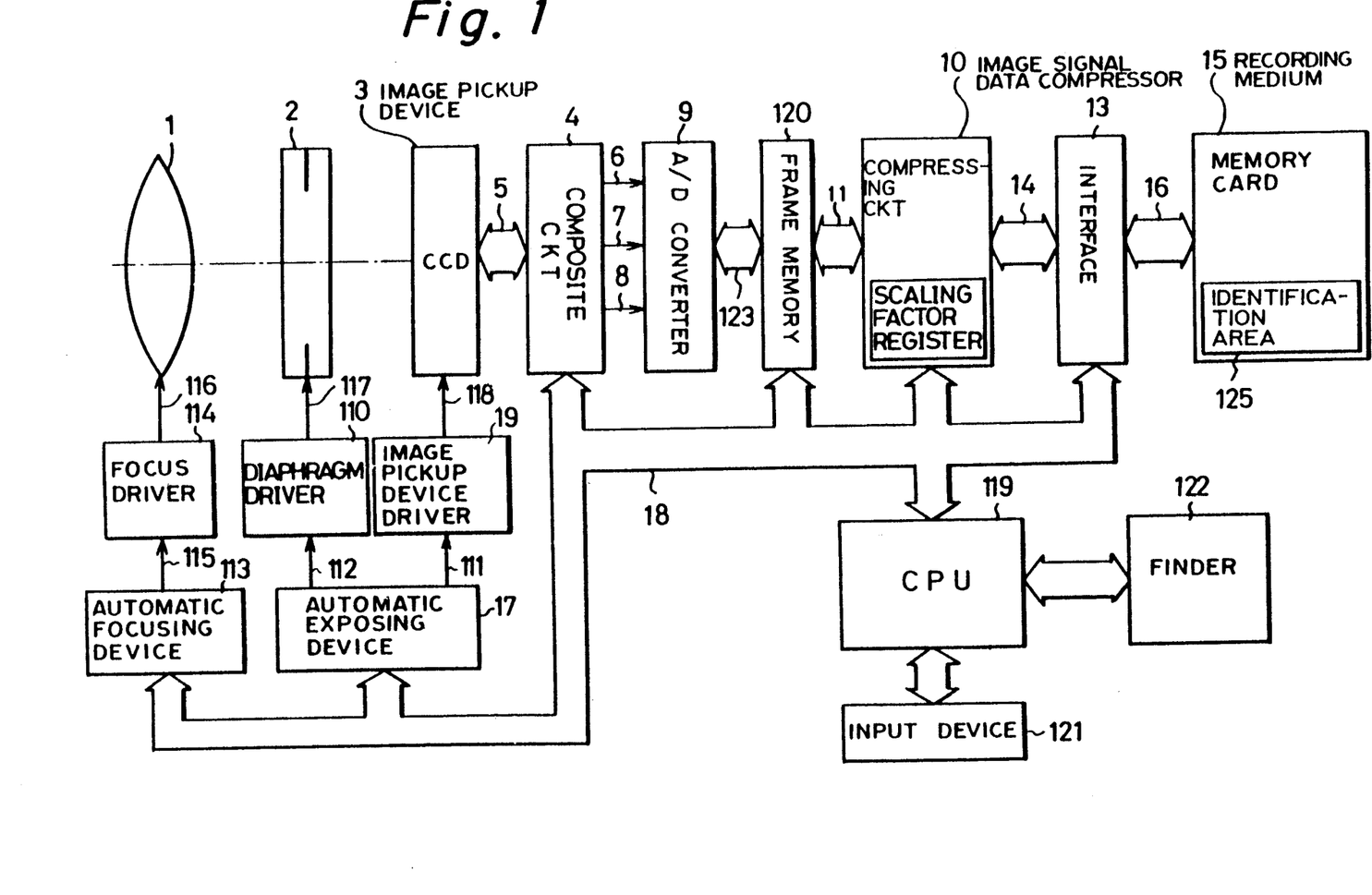
FIG. 1 is a block diagram to show a preferred embodiment of a digital electronic still camera according to the present invention.

In FIG. 1, reference numeral 1 denotes camera lens of the electronic still camera, numeral 2 a diaphragm, and 3 an image pickup means or device, e.g., a solid state image pickup device such as a CCD (charge-coupled device). Numeral 4 is a composite circuit connected to the image pickup device 3 to receive an output 5 therefrom and to produce brightness signal (Y) 6 and color difference signals (R-Y) 7 and (B-Y) 8 from primary color signals. Numeral 9 designates an analog-digital (A-D) converter to convert each of the signals 6, 7, 8 produced by the composite circuit 4, into digital signals. Numeral 120 represents a frame memory to store an output 123 from the A-D converter 9.

Numeral 10 denotes a compressing circuit or image signal data compressor which is connected to the frame memory 120 and effects a compression operation applying the adaptive discrete cosine transformation (ADCT). Also, "discrete cosine transformation" (hereinafter abbreviated as DCT) to an output 11 from the frame memory 120. Numeral 12 is a scaling factor register constituting a part of the compressing circuit 10 to store scaling factors for quantization as parameters for controlling coding bits and quality of decoded image as well. Numeral 13 stands for a memory card interface to receive coded and compressed image data 14 produced by the compressing circuit 10 under the control of scaling factors stored in the scaling factor register 12, and 15 a memory card as a recording medium connected to the interface 13 to record an output 16 therefrom.

Numeral 17 denotes an automatic exposing device which receives an output of the compressing circuit 10 put on a bus 18 and supplies drive outputs 111, 112 to an image pickup device driver 19 and a diaphragm driver 110, respectively. Numeral 113 denotes an automatic focusing device which receives the output of the compressing circuit 10 put on the bus 18 and supplies a drive output or automatic focusing data 115 to a focus driver 114. The focus driver 114 controls to drive the camera lens 1, the diaphragm driver 110 the diaphragm 2, and the image pickup device driver 19 the image pickup device 3, by drive signals 116, 117, and 118, respectively.

Numeral 119 represents a processing control unit comprising a central processing unit (CPU) or a single chip microcomputer which controls data transmission through the bus 18 between the constituting units. Numeral 121 is an input device, for instance, a key matrix for an operator to input a command corresponding to an image to be photographed, and 122 a display unit such as a finder visually observed by the operator. A specific image out of a scene or landscape, a face of a person or portrait, and a document preferably with command information is displayed on the display unit 122. Numeral 125 is an identification area to record identification data to identify the kind of recorded information, i.e., whether the recorded information is a document, a portrait, or a landscape.

Explained below are operations of the above-described camera.

An image to be photographed is picked up through the camera lens 1 of the electronic still camera, adjusted to a suitable light quantity by the diaphragm 2, and focused on the image pickup device 3. The photoelectric conversion is effected on the focused image data by the image pickup device 3 so as to provide the image signal output 5. The image signal output 5 is inputted into the composite circuit 4. The composite circuit 4 produces brightness signal (Y) 6, color difference signals (R-Y) 7, (B-Y) 8 and transmits them to the A-D converter 9. The A-D converter 9 converts the signals into the digital signal 123, which is stored in the frame memory 120.

The automatic exposure and the automatic focusing are attained by using DC and AC components, respectively, put on the bus 18. The automatic exposing device 17 calculates the DC component to output the automatic exposure data 111 to the image pickup device driver 19 and another data 112 to the diaphragm driver 110. Then the image pickup device driver 19 controls the image pickup device 3 through the output 118 to achieve the electronic shutter control, and the diaphragm driver 110 the diaphragm 2 through the output 117 to obtain the optimum exposure amount.

The automatic focusing is achieved by inputting the AC or high frequency components put on the bus 18 from the compressing circuit 10 into the automatic focusing device 113. The automatic focusing device 113 then performs calculation for the automatic focusing to output the automatic focusing data 115 to the focus driver 114. The focus driver 114 controls a position of the camera lens 1 through the output 116 to attain focusing of an image on the image pickup device 3.

The automatic focusing device 113 carries out the operation, for example, using the algorithm of exploratory method. The exploratory method uses the fact that the high frequency components are intensified as an image is going in focus. So, a feedback system is constructed to maximize an integration value of high frequency components in one field. The automatic focusing systems using such exploratory method are well known in the art, for instance, as shown in Japanese Unexamined Patent Publication KOKAI 157173/1989.

The thus focused image is transmitted through the A/D converter 9 to the frame memory 120 as the digital signal output 123, which is stored in the frame memory 120.

Figure 2:
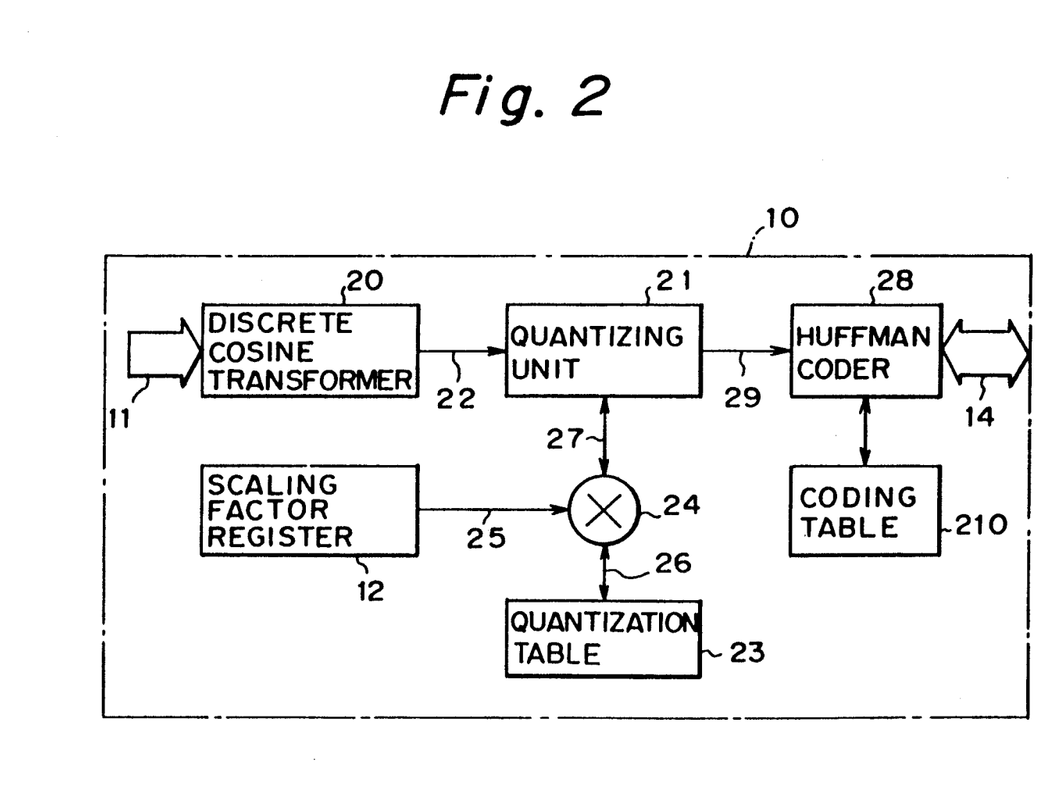
FIG. 2 is a block diagram to show an example of compressing circuit in the camera as shown in FIG. 1.

FIG. 2 is a block diagram to show the compressing circuit 10 in more detail. In FIG. 2, reference numeral 20 designates a discrete cosine transformer which carries out two-dimensional DCT for each small block of 8×8 pixels or picture elements, in the input image data 11. Numeral 21 denotes a quantizing unit to linearly quantize the output 22 from the discrete cosine transformer 20, and numeral 23 a quantization table or matrix in which different quantization step sizes are set in correspondence with the kinds of images as detailed later. The quantization table 23 is connected through a multiplier 24 to the quantizing unit 21. An output 25 from the scaling factor register 12 as also shown in FIG. 1 is inputted into the multiplier 24 as a scaling factor. Numeral 28 stands for a Huffman coder to effect the Huffman coding on the output 29 of the quantizing unit 21, and 210 a coding table connected to the Huffman coder 28, to be referred upon the coding of the output 29 of the quantizing unit 21.

The compression and the coding are carried out in FIG. 2 as follows. The digital signals 11 of image data inputted into the DCT unit 20 are divided into small blocks, each block composed of N×N pixels, i.e., N pixels for each horizontal and vertical direction. The number of divisions is determined in consideration of efficiency of orthogonal transformation. The two-dimensional DCT is executed in each of the small blocks to obtain the DCT coefficients. Upon the two-dimensional DCT the number N of pixels may be set to 8 or 16 considering the transformation efficiency. Although the transformation efficiency may increase as the number N is increased, the increasing rate shows to be saturated while the scale of operation unit becomes enlarged due to a large calculation scale. Therefore, the number N is set to 8 in the present embodiment. Thus the two-dimensional DCT is executed in each small block composed of 8×8 pixels. The obtained DCT coefficient output 22 is linearly quantized by the quantizing unit 21 using the quantization table 23 to get a different quantization step size for each pixel varied according to the kinds of images to get quantization coefficients. Actually DCT coefficient output 22 is divided by the output 27 of the multiplier 27 and then linearly quantized. The quantization coefficient output 29 is coded following the Huffman coding in use of the coding table 210.

Figure 3A:
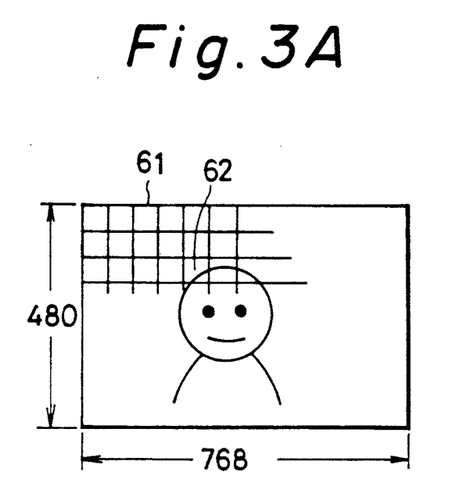
FIGS. 3A~3C are drawings to illustrate transformation process of two-dimensional DCT and DCT coefficients.
Figure 3B:
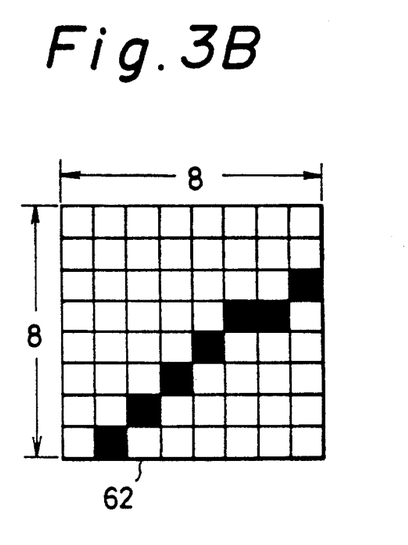

FIG. 3A shows a simplified portrait image 61 of a full screen composed of 480×768 pixels, an arrowed small block 62 composed of 8×8 pixels is shown in more detail in FIG. 3B. As shown in FIG. 3B, there are 64 pixels in total in the small block 62. Thus the screen is divided into 5760 small blocks, each having 64 pixels.

Figure 3C:
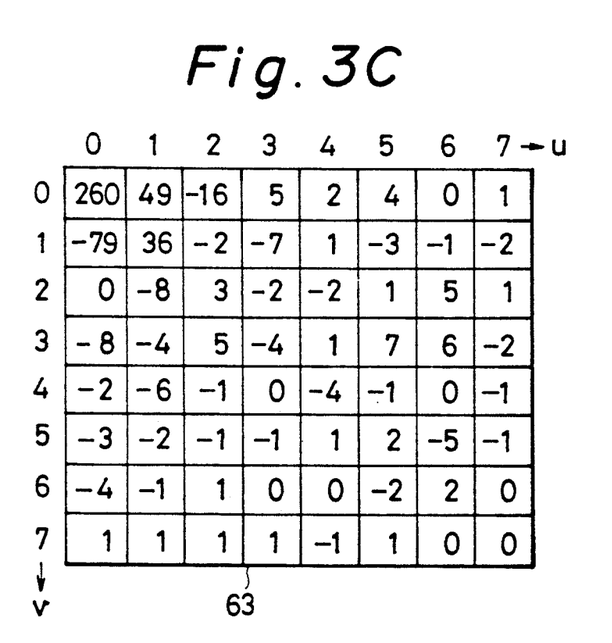

FIG. 3C shows a distribution 63 of transformation coefficients of the two-dimensional DCT in a small block which is derived from a real portrait image. The DCT coefficients form a two-dimensional spectrum incorporating the horizontal and the vertical coordinates (u,v) of frequency domain. It is easily understood from FIG. 3C that a region near the coordinates (0,0) or the origin corresponds to a part of high DCT coefficient power whereas a region close to the coordinates (7,7) to a part pf reduced power. The coefficient distribution 63 varies depending on a local feature of each small block. It is general that the powers of transformation coefficients are distributed mainly in the region of low frequencies.

The image 61 as shown in FIG. 3A is inputted into the compressing circuit 10 in FIG. 1. The image is divided in the compressing circuit 10 into small blocks 62, in each of which the DCT is carried out to attain a distribution 63 of DCT coefficients. The power distribution or spectrum distribution (frequency characteristics) thus obtained by the DCT remarkably differs among a document image with letters, a portrait image, and a landscape image.

Figure 4:
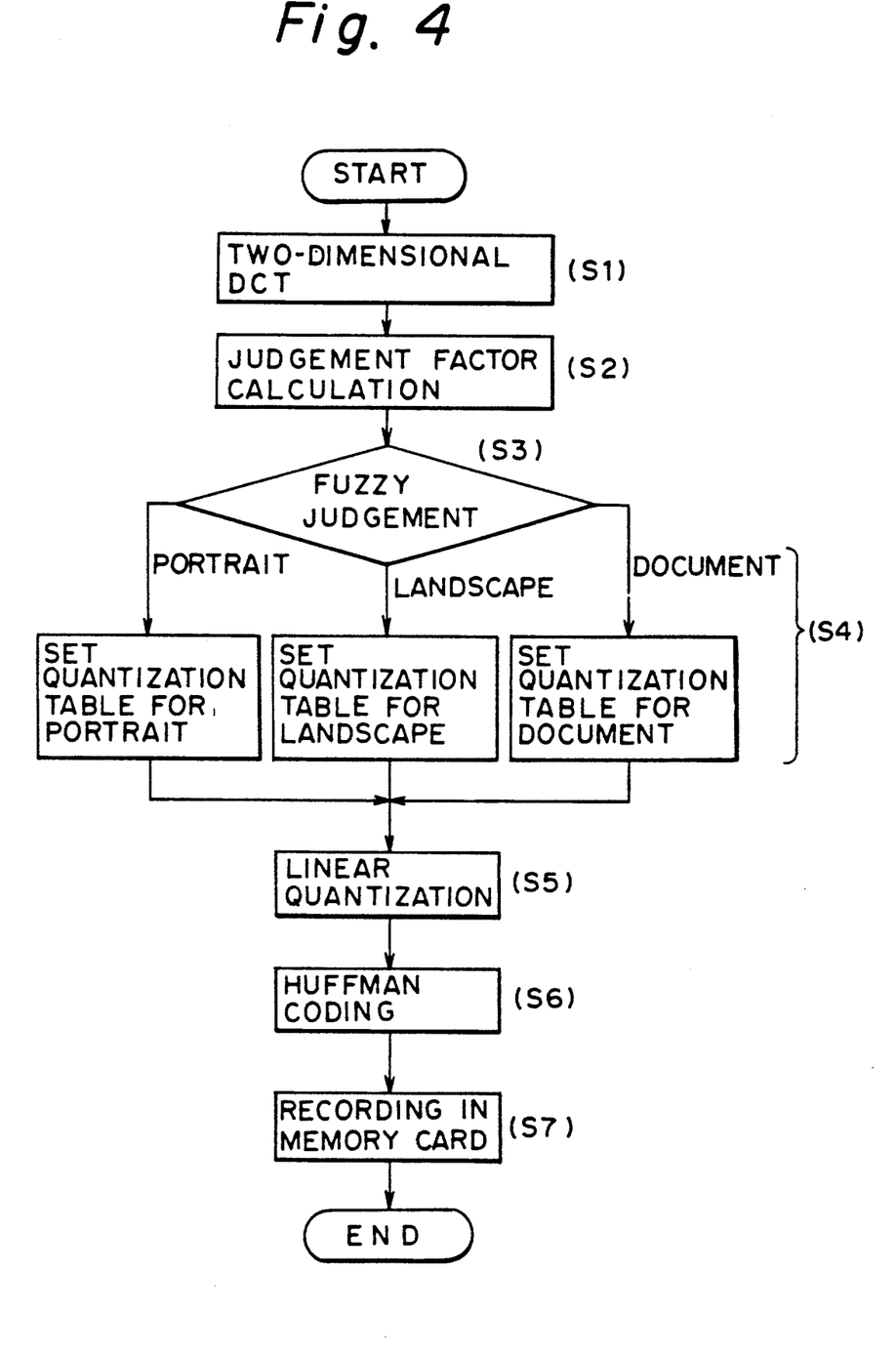
FIG. 4 is a flow chart of operations of compression and recording.

FIG. 4 is a flow chart of operations of image judgement and recording. When an image becomes in focus, the automatic focusing device 113 as shown in FIG. 1 transmits an in-focus signal through the bus 18 to the processing control unit 119. After receiving the infocus signal, the processing control unit 119 transmits commands through the bus 18 to the frame memory 120, so that the frame memory 120 fixes image data of the infocus image photographed. The compressing circuit 10 starts the DCT operation for the data.

The two-dimensional DCT is effected on the image data in the compression circuit 10 (S1). DCT coefficients thus obtained are transmitted to the processing control unit 119 as shown in FIG. 1.

The DCT coefficients show the spectrum distribution or characteristic parameter of transformed components, which can be compressed in the compression circuit 10. The processing control unit 119 compares the obtained spectrum distribution of the photographed image with respective spectrum distributions of document, portrait, and landscape statistically determined to get attribute factors for judgement of the kind of image (S2).

The control unit 119 executes judgement or inference of the kind of the photographed image using a membership function of the fuzzy control theory to determine whether the photographed image is a document, a portrait, or a landscape (S3). Then the processing control unit 119 sets a quantization table suitable for the photographed image in the compressing circuit 10 (S4). The quantizating unit 21 effects the linear quantization on the DCT coefficients with reference to the set quantization table (S5). The quantized coefficients are coded in the Huffman coder 28 using the Huffman coding, which is one of entropy codings (S6). The Huffman-coded data 14 is transmitted to the memory interface 13 as shown in FIG. 1, an output of which is recorded in the memory card 15 (S7).

Figure 5A:
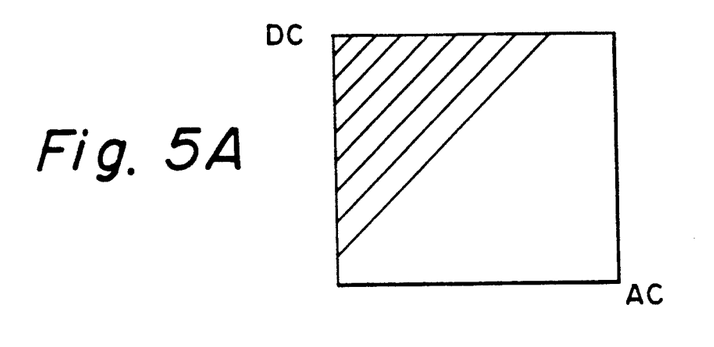
FIGS. 5A~5C are drawings to schematically illustrate a set of quantization tables.
Figure 5B:
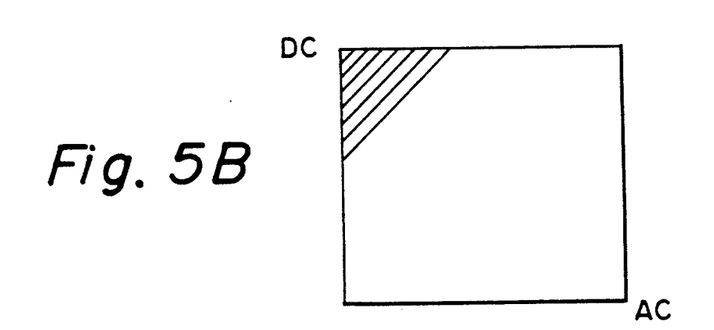
Figure 5C:
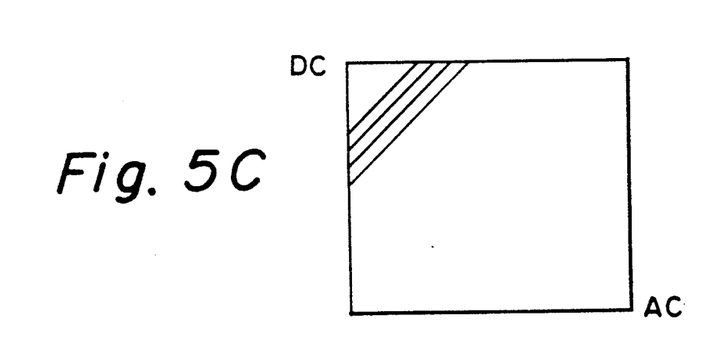

FIGS. 5A to 5C are drawings to schematically illustrate quantization tables corresponding to respective images. FIG. 5A shows a quantization table for landscape images, FIG. 5B that for portrait images, and FIG. 5C that for document images. Oblique lines in the drawings are weighted parts given small values.

Consequently, an image can be adjusted to the optimum quality of image with respect to the frequency characteristics or spectrum distribution of the image. Such quantization tables may be determined by a statistical method.

Figure 6A:
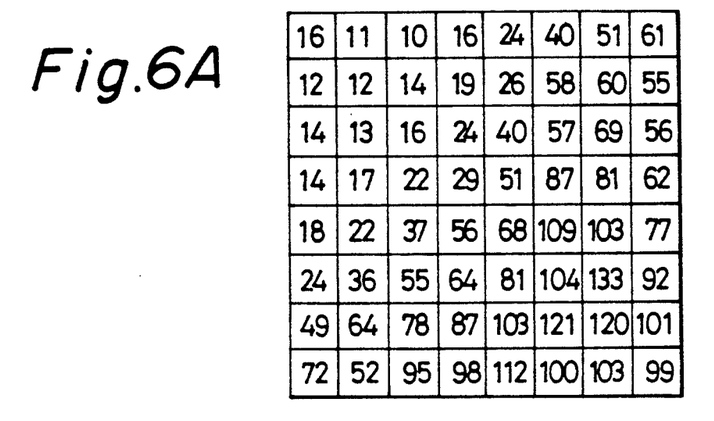
FIGS. 6A~6C are drawings to illustrate the set of quantization tables in detail.
Figure 6B:
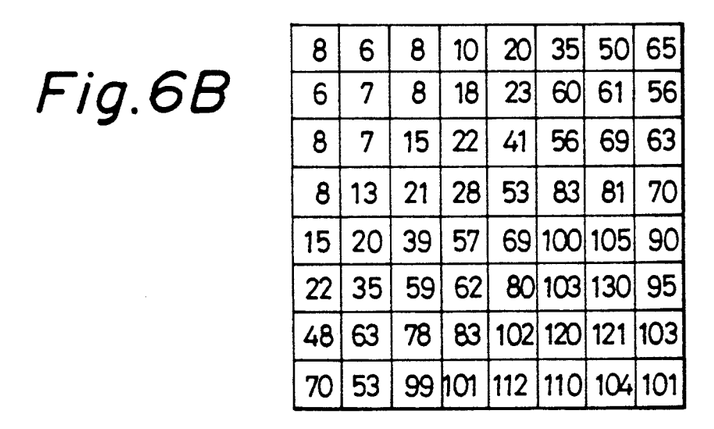
Figure 6C:
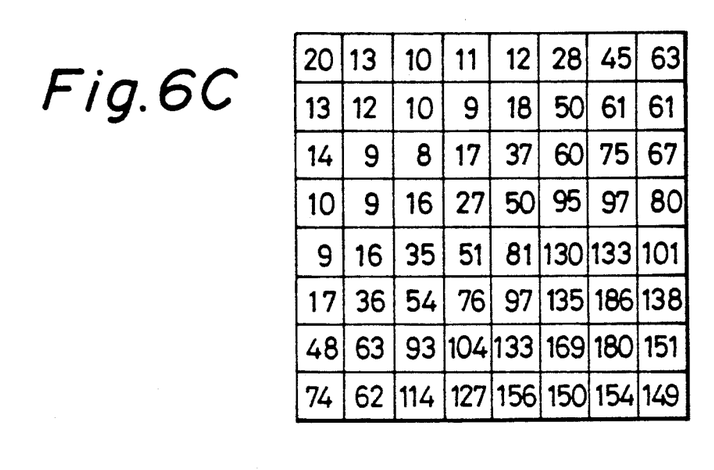

FIGS. 6A to 6C are drawings to illustrate the quantization tables corresponding to respective images in detail. FIG. 6A shows a quantization table for landscape images, FIG. 6B that for portrait images, and FIG. 6C that for document images. For the quantization table for a document image (FIG. 6C), the values for high frequency squares are chosen about 1.5 times larger, because harmonics components are dominant in it. For the quantization table for portrait image (FIG. 6B), the values for the DC and low frequency squares are chosen two thirds of that for the landscape image, because they are important in it.

Figure 7A:
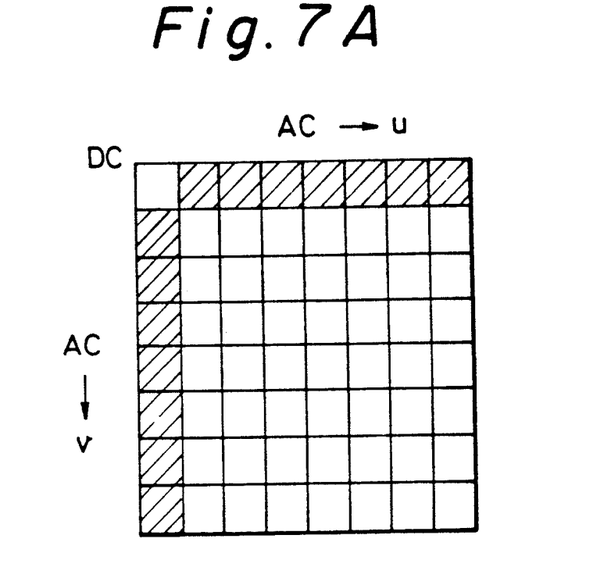
FIG. 7A and FIG. 7B are drawings explaining how to get variables used for fuzzy inference.
Figure 7B:
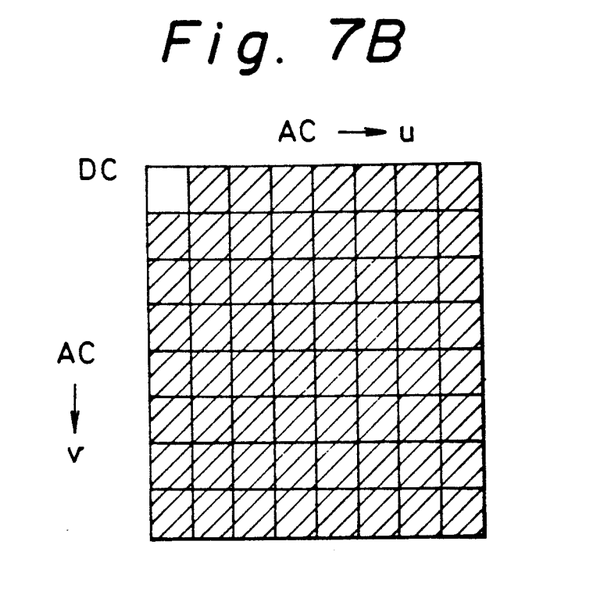

FIG. 7A and FIG. 7B show respectively a small block composed of 8×8 pixels of the image. In FIG. 7A, the first row and first column except the origin are hatched. The DCT coefficient powers in the hatched squares of the small block are summed to get a variable x. In FIG. 7B, all the squares except the origin are hatched. The DCT coefficient powers in the hatched squares are summed to get another variable AC*. The DCT coefficient power in the origin which is DC is divided by the AC* to get AC*/DC or a variable y.

Figure 8A:
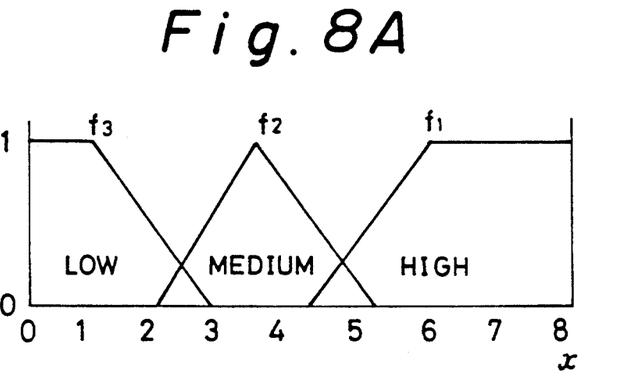
FIG. 8A, FIG. 8B and FIG. 8C are drawings of membership functions.
Figure 8B:
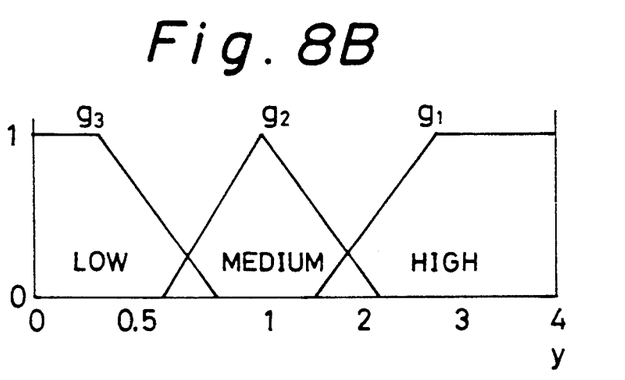
Figure 8C:
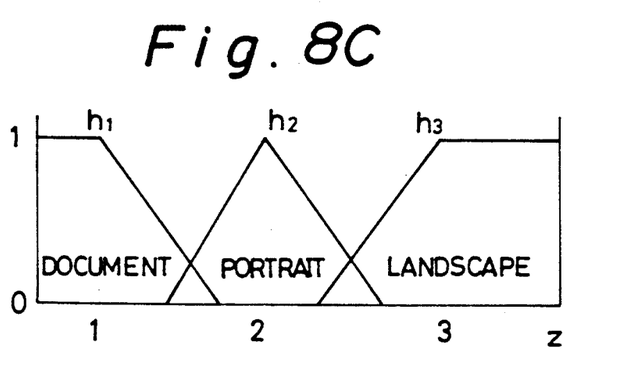

FIG. 8A shows membership functions f1(x) (high), f2(x) (medium), f3(x) (low) of variable x of input space X. FIG. 8B shows membership functions g1(y) (high), g2(y) (medium), g3(y) (low) of variable y of input space Y. FIG. 8C shows membership functions h1(z) (document), h2(z) (portrait), h3(z) (landscape) of variable z of output space Z. As shown in the figures, each membership function consists of a broken line.

Linguistic rules for the fuzzy logic are as follows.

Rule R1: If x is large and y is large, then z is a document

Rule R2: If x is medium and y is medium, then z is a portrait.

Rule R3: If y is small, then z is a landscape.

For example, x and y are assumed to be x=7 and y=2, then we have the following.

f1(x)=1 f2(x)=0 g1(y)=0.35 g2(y)=0.2 g3(y)=0

Then we have the following according to fuzzy inference.

$$h1^*(z) = (1 \wedge 0.35) \wedge h1(z) = 0.35 \wedge h1(z)$$

$$h2^*(z) = (0 \wedge 0.2) \wedge h2(z) = 0 \wedge h2(z) = 0$$

$$h3^*(z) = 0 \wedge h3(z) = 0$$

$$h^*(z) = h1^*(z) \vee h2^*(z) \vee h3^*(z) = h1^*(z)$$

Figure 9:
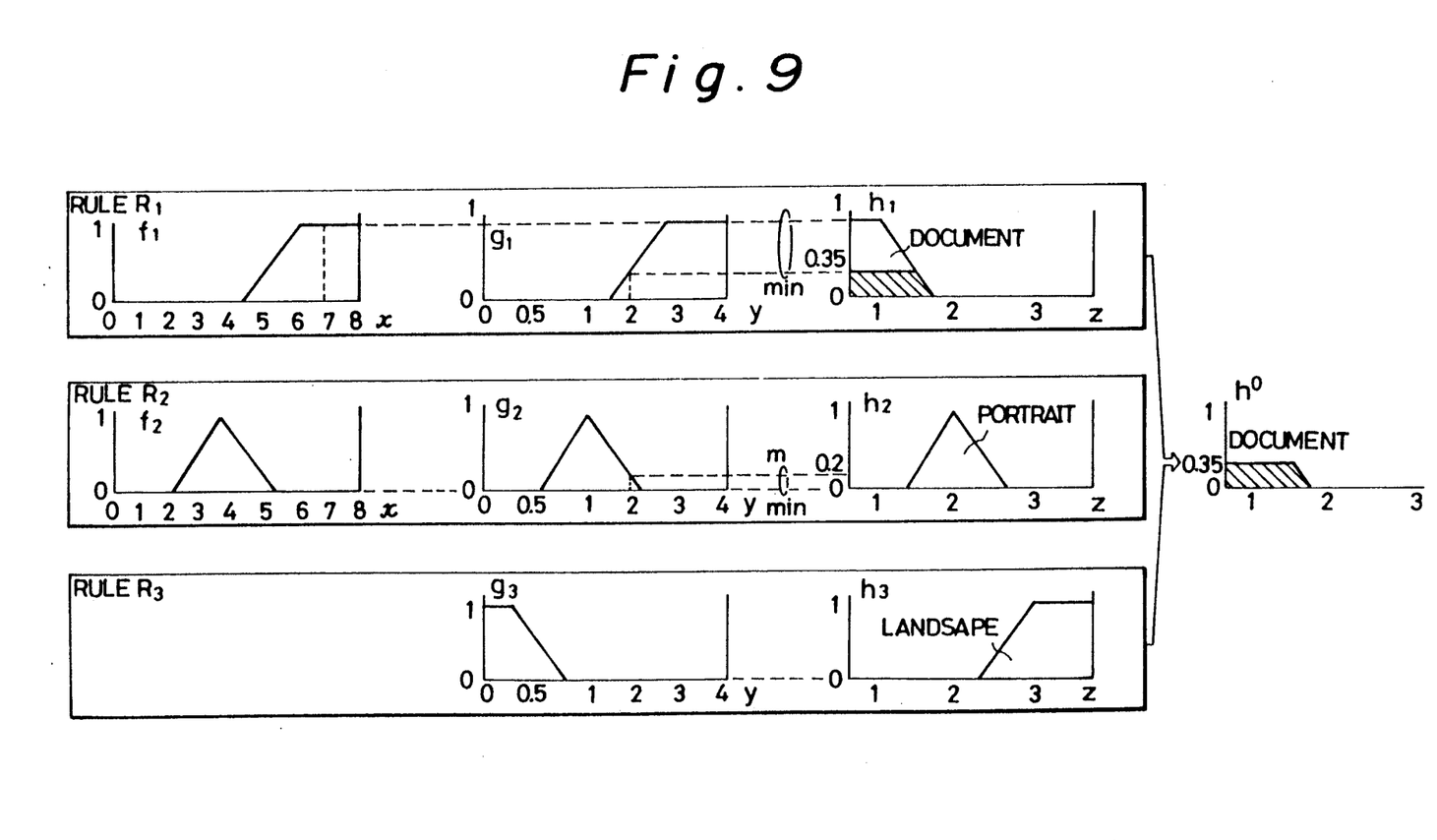
FIG. 9 is a drawing explaining fuzzy inference.

The hatched portion in the upper block of FIG. 9 denotes the membership function $h1^*(z)$ that is head-cut $h1(z)$. Now we assume that the image is a document if $z \leq 1.5$, portrait if $1.5 < z < 2.5$ and landscape if $z \geq 2.5$ in order to have nonfuzzy output. Then the image is determined to be a document because the z is 1.1 according to the well known center of gravity method.

It is also considered in the above embodiment that the attribute judgement in the processing unit 119 serving as the image attribute judgement means may be dominated by an external, manual setting of attribute on the input device 121 having respective setting keys. By this arrangement, if consecutive images belong to the same kind, the manual setting of the kind, either of document, portrait, or landscape, may reduce the operation time for the attribute judgement and prevent misjudgement.

As described above, in the digital electronic still camera according to the present invention, the optimum quantization table is set upon compression of image signal data in correspondence with the kind of image, so that the quality of image may be readily adjusted for respective images. And it should also be understood that only two quantization tables for document and nature may be prepared to have reasonable quality of the decoded image. The judgement accuracy may also be improved by employing the fuzzy control theory for the judgement of the kind of image. Further, high speed data processing may be accomplished by the manual setting of image kind as well as appropriate image quality control.

Many widely different embodiments of the present invention may be constructed without departing from the spirit and scope of the present invention. It should be understood that the present invention is not limited to the specific embodiments described in the specification, except as defined in the appended claims.

What is claimed is:

1. A digital electronic still camera, comprising:
   image pickup means for picking up an image of a field to be photographed;
   block-dividing means for dividing the image into a plurality of blocks which are respectively made up of a plurality of pixels;
   transforming means for executing an adaptive discrete cosine transformation of each block of the image to generate a corresponding block of image data;
   quantizing means for quantizing the image data of each block with reference to a quantization table selected as an optimum one from a plurality of quantization tables having different quantization step sizes;
   image attributable judging means for judging an image attribute based on a spectrum distribution of the image data selected as membership functions of fuzzy decision;
   quantization table setting means for selecting a quantization table as the optimum one based on the image attribute obtained;
   coding means for coding the image data quantized; and
   recording means for recording the coded image data into a memory.

2. A digital electronic still camera according to claim 1, wherein the plurality of quantization tables are quantization tables for a document, a portrait and a landscape.

3. A digital electronic still camera according to claim 2, wherein the optimum quantization table is constructed by selecting a quantization table based on the image attribute obtained and multiplying the selected quantization table by a scaling factor.

4. A digital electronic still camera according to claim 1, wherein the plurality of quantization tables are quantization tables for a document and a nature.

5. A digital electronic still camera according to claim 4, wherein the optimum quantization table is constructed by selecting a quantization table based on the image attribute obtained and multiplying the selected quantization table by a scaling factor.

6. A digital electronic still camera according to claim 1, wherein the plurality of blocks are respectively made up of $N \times N$ pixels, where N is an integer greater than or equal to two.

7. A digital electronic still camera, comprising:
   image pickup means for picking up an image of a field to be photographed;
   block-dividing means for dividing the image into a plurality of blocks which are respectively made up of a plurality of pixels;
   transforming means for executing an orthogonal transformation of each block of the image to generate a corresponding block of image data;
   quantizing means for quantizing the image data of each block with reference to a quantization table selected as an optimum one from a plurality of quantization tables including at least a quantization table for a document;
   image attribute judging means for judging an image attribute based on a spectrum distribution of the image data selected as membership functions as fuzzy decision;
   quantization table setting means for selecting a quantization table as the optimum one based on the image attribute obtained;
   coding means for coding the image data quantized; and
   recording means for recording the coded image data into a memory card.

8. A digital electronic still camera according to claim 7, wherein the orthogonal transformation is an adaptive discrete cosine transformation.

9. A digital electronic still camera according to claim 7, wherein the plurality of blocks are respectively made up of $N \times N$ pixels, where N is an integer greater than or equal to two.

* * * * *